United States Patent [19]

Chawla et al.

[11] Patent Number: 5,478,542
[45] Date of Patent: Dec. 26, 1995

[54] PROCESS FOR MINIMIZING POLLUTANT CONCENTRATIONS IN COMBUSTION GASES

[75] Inventors: Jogindar M. Chawla, Ettlingen; Joachim von Bergman, deceased, late of Mulheim/Ruhr, by Marina von Bergmann, administratrix; Reinhard Pachaly, Kerpen, all of Germany

[73] Assignee: Nalco Fuel Tech, Naperville, Ill.

[21] Appl. No.: 294,609

[22] Filed: Aug. 23, 1994

Related U.S. Application Data

[63] Continuation of Ser. No. 952,621, Nov. 23, 1992, abandoned.
[51] Int. Cl.⁶ .................................................. B01D 53/34
[52] U.S. Cl. ............................................................ 423/235
[58] Field of Search ..................................... 423/235, 239

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,719,092 | 1/1988 | Bowers | 423/235 |
| 4,777,024 | 10/1988 | Epperly et al. | 423/235 |
| 4,842,834 | 6/1989 | Burton | 423/239.1 |
| 4,844,878 | 7/1989 | Epperly et al. | 423/235 |
| 4,877,591 | 10/1989 | Epperly et al. | 423/235 |
| 4,915,036 | 4/1990 | DeVita | 110/215 |

FOREIGN PATENT DOCUMENTS

| | | |
|---|---|---|
| 2627880 | 11/1982 | Germany . |
| 8702025 | 4/1987 | WIPO . |

OTHER PUBLICATIONS

The Role of minute Droplets in the Separation of Aerosols from Gases, Chawla, J. M., Chem. Eng. Process 26 (1989), pp. 201–205, (no month).

Flussigkeitszerstaubungs–und Impragnierungsanlagen, Chawla, J. M., Sonderdruck Chemie–Technik (1980), pp. 2–4. (no month).

Atomisation of Liquids Employing the Low Sonic Velocity in Liquid/Gas Mixtures, Chawla, J. M., International Congress on Liquid Atomization and Spraying Systems, Imperial College (1985) (no month).

Reduction of Noxious Gas and Fines Emission by Dry Sorption and Filtering Dust Collectors Installed Behind Combustion Plants, Glinka, U., Bundesministerium fur Forschung und Technologie (BMFT), 1984. (abstact only).

NOx Control for Municpial Solid Waste Combustors, Hofmann, J. E., et al, Air & Waste Management Assn., Pittsburgh, Pa., Jun. 24–29, 1990.

The NOxOut Process for the Control of the NOx Emissions from Waste Incinerators, Pachaly, R., et al, Air & Waste Management Assn, Vancouver, B.C., Jun. 16–21, 1991.

Primary Examiner—Michael Lewis
Assistant Examiner—Thomas G. Dunn, Jr.
Attorney, Agent, or Firm—St. Onge Steward Johnston & Reens

[57] ABSTRACT

Distribution of pollution reducing agents within an effluent at the effective temperature window for effective gas phase reaction is greatly improved. A two-phase mixture having fine droplets of liquid, e.g. a $NO_x$ reducing agent such as aqueous solutions of urea or ammonia, dispersed in a gaseous component, such as air, is injected into the effluent an sonic velocity to achieve a distribution of particles of sizes effective to uniformly reduce $NO_x$ within the zone of effective temperature while not producing a significant level of droplets so large that they survive beyond the temperature zone.

9 Claims, 5 Drawing Sheets

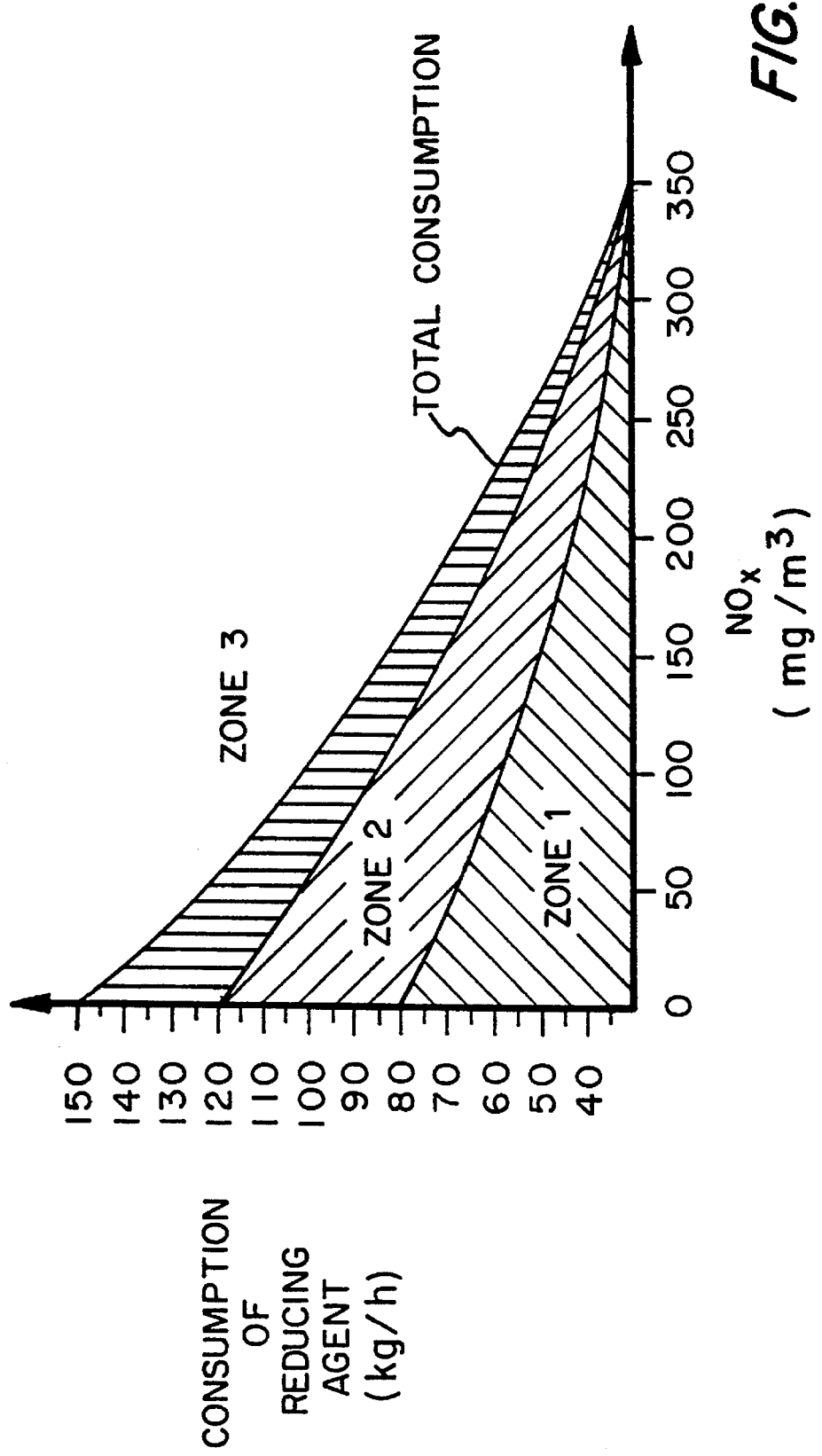

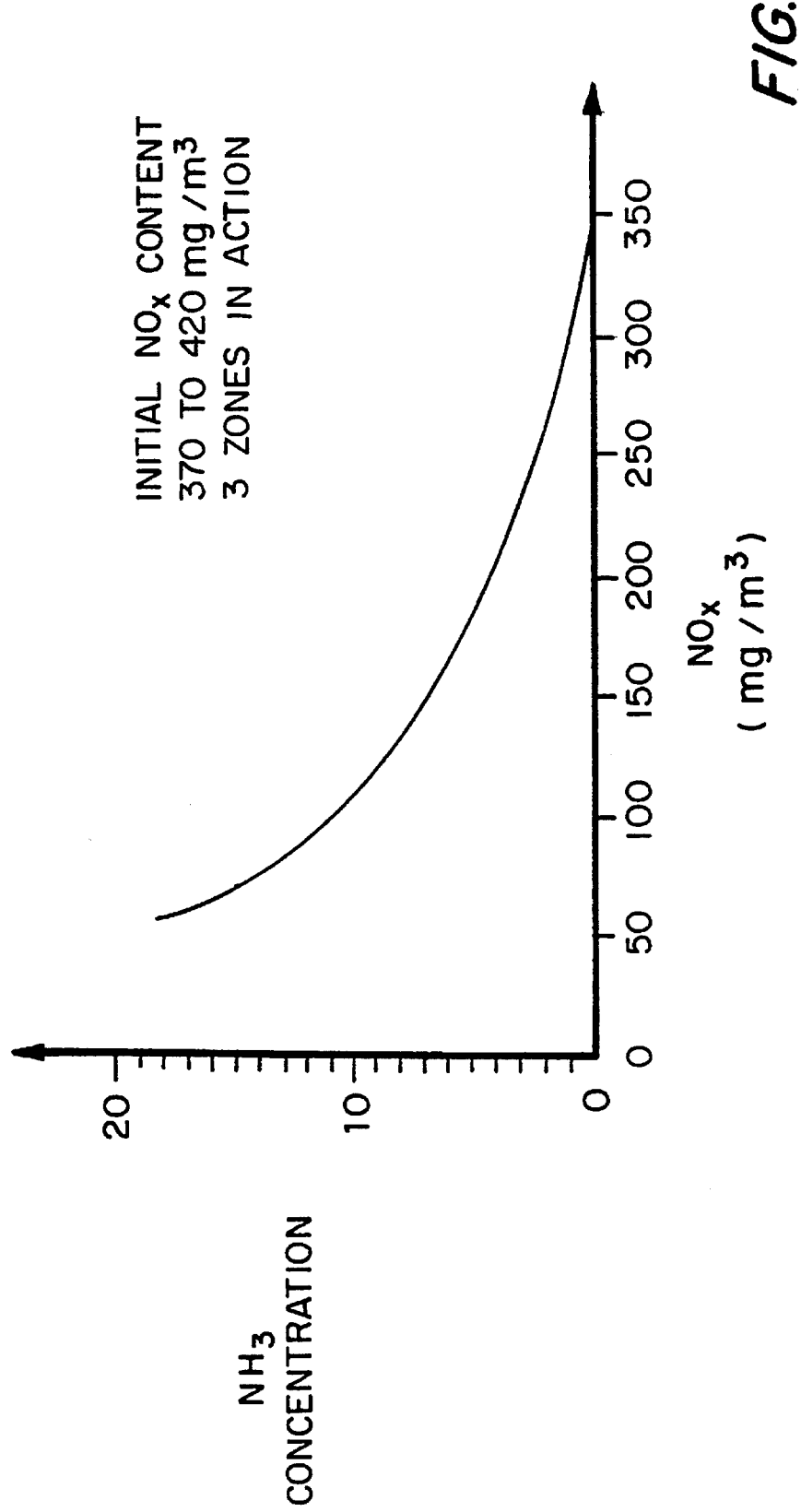

PROCESS FOR MINIMIZING POLLUTANT CONCENTRATIONS IN COMBUSTION GASES

This is a continuation of Ser. No. 07/952,621 filed on Nov. 23, 1992, now abandoned.

TECHNICAL FIELD

The invention relates to an improved process and apparatus for minimizing pollutant concentrations in combustion gases from carbonaceous fuels. In particular, introduction of chemicals for the reduction of pollutants such as nitrogen oxides is improved.

When carbonaceous materials are combusted in large plants, a number of pollutants including sulfur oxides ($SO_x$) and nitrogen oxides ($NO_x$), are produced. In these operations, which include utility boilers as well as incinerators and other combustors, the flame temperatures are typically higher than 1100° C., often within the range of from 1200° to 1650° C., to achieve efficient combustion. At such high temperatures, unfortunately, nitrogen oxides ($NO_x$) formation is greatly increased because the conditions favor formation of oxygen and nitrogen free radicals and their chemical combination as nitrogen oxides.

In order to reduce the formation of $NO_x$, the flame temperatures can be reduced. Procedures employing this technique are referred to as primary measures and may involve using excesses of air or fuel or by a combination of both in staged combustion. However, such measures typically produce undesirable levels of carbonaceous pollutants, such as carbon monoxide. There is no known primary method which enables reduction of both nitrogen-bearing and carbonaceous pollutants to acceptable levels without serious economic drawbacks.

A number of economically attractive secondary measures have been developed which enable combustion to take place under efficient conditions, with resultant $NO_x$ generation, but then reduce the $NO_x$ by conversion into other compounds which can either be emitted or eliminated from the flue gas. Of these, selective, gas phase reactions are advantageous because they permit reduction of $NO_x$ while using relatively low levels of chemical reducing agents. Such processes can be divided into two groups—catalytic and non-catalytic. The present invention concerns selective non-catalytic chemical reduction (SNCR) processes. The SNCR processes are advantageous because they permit a reducing agent to be introduced directly into the combustion apparatus without the need for extensive capital equipment. Thus, both capital and operational costs are kept low.

A variety of different SNCR processes have been developed for minimizing nitrogen oxides with reducing agents including ammonia, urea or other nitrogen-containing chemicals. However, effective and economical reaction in the gas phase depends on achieving good distribution of reducing agents. Incomplete or non-uniform mixing can have a number of adverse results including poor chemical utilization and the release of ammonia into the atmosphere. Moreover, if the fuels contain significant amounts of sulfur, ammonia can react with the sulfur and form solid ammonium sulfates which deposit on heat exchange surfaces and can quickly reduce heat transfer efficiency.

Distribution of pollutant reducing agents is especially troublesome where the geometry of the effluent passage, in terms of heat transfer tubes, walls or other restrictions, too severely limits the mixing time available for a reducing agent or too greatly restricts the ability to introduce reducing agent deeply enough into the effluent stream. Distribution problems require the use of greater amounts of reducing agents, often result in the production of secondary pollutants, and can cause damage to equipment through the formation of deposits on heat exchange and other surfaces by direct chemical impingement and precipitate formation.

BACKGROUND ART

One SNCR process is described by Lyon in U.S. Pat. No. 3,900,554 in terms of reducing the concentration of nitrogen monoxide (NO) is combustion gases. Lyon discloses injecting ammonia or certain ammonia precursors or their aqueous solutions into an oxygen-rich waste gas for selective reaction with the nitrogen monoxide an a temperature in the range of from 870° to 1100° C. In this process, it is important that the temperature of the combustion effluent lie within a narrow "temperature window" during the contact with the gaseous ammonia. The limiting values of the window can be reduced by the addition of certain substances. Distribution of the ammonia within the combustion effluent is critical no achieving maximum utilization of the ammonia and reduction of NO within the defined temperature window. Ineffective utilization will increase costs and cause other problems associated with ammonia discharge.

In another secondary SNCR approach, Arand et al disclose in U.S. Pat. No. 4,208,386 that urea can be added alone or in solution to oxygen-rich effluents in a temperature range from 700° to 1100° C. Any urea which fails to react with $NO_x$ within the temperature window is, nonetheless chemically transformed by heat and some, during cooling, results in ammonia formation. Again, here, as with the Lyon process, distribution is critical to selective reduction and, therefore, to economic operation and avoidance of the problems associated with ammonia discharge.

Similarly, in U.S. Pat. No. 4,325,924, Arand et al describe an SNCR process utilizing urea in fuel-rich combustion effluents. Effluents of this type can be generated by staged combustion, which can lead to the formation of high levels of carbonaceous pollutants. Again, distribution is critical and, if ineffective, can have adverse economic as well as environmental impact. A number of other disclosures in the field of SNCR suggest improvements over the aforementioned processes. For example, in WO 87/02025, Bowers discloses than if droplet size is increased and urea concentration is decreased, good results can be achieved at higher temperatures than disclosed by Arand et al. Distribution, however, remains critical here. In a further modification, Bowers discloses in U.S. Pat. No. 4,719,092 that an additional material, an oxygen-containing hydrocarbon, can be injected together with an aqueous urea solution to reduce residual ammonia concentration in the effluent. Despite the added material, distribution remains critical.

In an effort to achieve better distribution by injection, DeVita describes an injector in U.S. Pat. No. 4,915,036 which shows good distribution of injected fluids while the danger of clogging is minimized. This specification discloses the need for good distribution of chemicals and enables improving it where boiler geometry permits. There are, however, boiler configurations which will not permit the solution provided there. Similarly, in U.S. Pat. No. 4,842,834, Burton describes an injector which, while effective in many combustor configurations, is sometimes limited in effectiveness by boiler geometry and operating conditions.

There is a present need for a process to effectively minimize combustion generated pollutants, such as nitrogen oxides, while simultaneously minimizing secondary pollutants, such as carbon monoxide and ammonia, in the final effluent by achieving more uniform distribution of pollutant reducing agents at the effective temperature ranges for the chemicals concerned, especially in effluent passages having geometries and load-determined temperature profile characteristics which adversely impact distribution.

DISCLOSURE OF INVENTION

It is an object of the present invention to provide a process and apparatus for improving the introduction and utilization of pollutant reducing chemicals into hot combustion effluents. A more particular object is the provision of a process and apparatus capable of improving ability of known SNCR processes to minimize the nitrogen oxide concentration in an effluent from the combustion of a carbonaceous fuel while keeping secondary pollutant concentrations, such as carbon monoxide and ammonia, low and mitigating other utilization and distribution problems.

It has been found that these and other objects can be achieved by the invention which enables distributing reducing agents evenly within an effluent over a cross section where the effective temperature window for the reduction exists. It has been found according to the invention, despite the contrary teachings and experience of the prior art, that the reducing agent can be atomized and injected as fine droplets which are completely and rapidly evaporated to facilitate selective gas phase $NO_x$ reducing reactions across the entire cross section of an effluent passage.

The invention provides a process and apparatus for reducing the concentration of pollutants such as $NO_x$ in a combustion effluent. The process comprises: preparing a two-phase pollutant reducing mixture containing liquid and gaseous components; and injecting the pollutant reducing mixture, as a dispersion of liquid droplets in a gas stream at the sonic velocity of the mixture, into a passage containing a combustion effluent at a temperature effective for reduction of the pollutant. The apparatus comprises: means for supplying pollutant reducing agent, solvent for the agent and gas to a nozzle means adapted to inject a mixture of these components into an effluent passage; and nozzle means for preparing a two-phase pollutant reducing mixture containing liquid ant gaseous components and injecting the pollutant reducing mixture at its characteristic sonic velocity into said effluent passage an a temperature effective for reduction of the pollutant.

The flow rates of the two phases are selected, having regard for the particular nozzle, such that the velocity of the two-phase mixture when leaving the nozzle is equal to its characteristic sonic velocity. At the sonic velocity, the pressure drop, i.e. the sudden pressure reduction which occurs at the nozzle outlet, is effective to shatter the liquid component into a dispersion of fine droplets.

By variation of the component pressures, the air-to-liquid ratio and the pressure drop at the outlet of the nozzle, the depth of penetration of the liquid droplets into an effluent passage can be adjusted. Surprisingly, liquid droplets with relatively small diameters, e.g., on the order of approximately 50 μm, and sonic velocity, e.g., on the order of 20 to 30 meters per second, can be effectively utilized to reduce $NO_x$ by achieving penetration across an entire passage cross section of even 4 to 7 meters.

It is an advantage of the invention that the range of droplet sizes produced at the sonic velocity of the mixture has a well-defined upper limit determined by the conditions at the nozzle. This feature enables penetration to a desired distance within an effluent passage without the production of large numbers of liquid droplets which are so large that they survive beyond the effective temperature window and cause production of ammonia or survive to impinge on an obstruction limiting the treatment zone.

Improvements in pollutant (e.g., $NO_x$ and $SO_x$) reduction, chemical utilization, lowered secondary pollutant emissions, and reduced equipment fouling can be achieved.

BRIEF DESCRIPTION OF THE DRAWINGS

The invention will be better understood and its advantages will become more apparent when the following detailed description is read in conjunction with the accompanying drawings, in which

FIG. 5 shows the ammonia concentration in the effluent gas depending on the nitrogen oxide content; and FIG. 6 shows the consumption of reducing agent depending on the nitrogen oxide content.

BEST MODE FOR CARRYING OUT THE INVENTION

This invention relates to a process and apparatus for reducing the concentration of nitrogen oxides, or other pollutants, in an effluent from the combustion of a carbonaceous fuel. Although this description is written in terms of reducing nitrogen oxides concentrations in oxygen-rich effluents, it will be recognized that the present invention is equally applicable to any situation requiring controlled penetration of an atomized fluid into a high temperature environment. Moreover, it will further be recognized that the figures are schematic representations for purposes of illustration and may not depict the actual relative sizes or locations of the elements shown.

For the purposes of this description, all temperatures herein are measured using a suction pyrometer employing a k-type thermocouple. Droplet sizes are determined with a Malvern 2200 instrument, utilizing a Franhofer diffraction, laser-based system. And, unless otherwise indicated, all parts and percentages are based on the weight of the composition at the particular point of reference.

Figure 1:
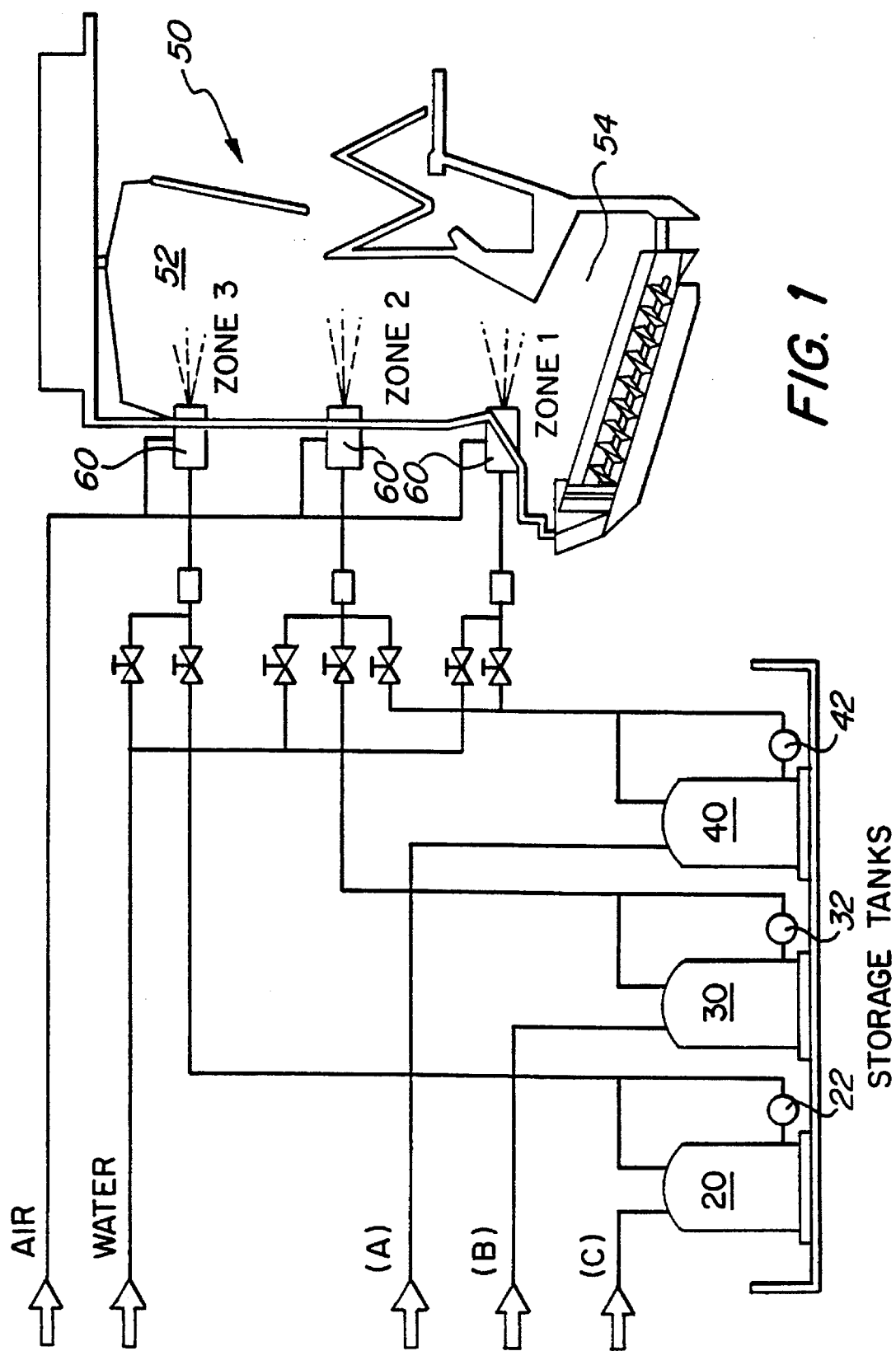
FIG. 1 is a Flow chart of an apparatus according to the invention.

As illustrated in FIG. 1, the apparatus of the invention is capable of supplying a pollutant reducing agent comprised of one or more active components in a mixture of liquid and gaseous components. The individual active components are shown as A, B and C in FIG. 1 and are stored in tanks 20, 30 and 40, which are associated with metering pumps 22, 32 and 42 as well as suitable conduits, and valves no enable mixing in the manner called for by a controller (not shown or manual operation.

The liquid component of the two phase mixture typically comprises a solution having at least one additive compound effective in reducing $NO_x$ and/or $SO_x$ under the conditions of injection. The temperature of the effluent an the point of injection, the concentration of the additive compound in the solution, and the size of the droplets in the dispersion, are selected to achieve reduction in nitrogen oxides or other pollutant levels in the effluent. The active pollutant reducing agent, e.g., $NO_x$ reducing agent, is desirably incorporated in the liquid phase of the mixture. One embodiment of the invention provides for introducing a $NO_x$ reducing agent as an aqueous treatment solution, such as urea alone in water or urea in water with one or more enhancers. It is possible, consistent with effectiveness to employ either the liquid or gaseous components as a multiphase mixture. For example, the liquid component can include suspended solids or an immiscible fluid material. The gaseous component can be similarly complex.

The term urea as employed in this description includes the compound urea itself, as well as compounds equivalent in effect. Among these compounds are ammonium carbonate, ammonium formate, ammonium citrate, ammonium acetate, ammonium oxalate, other ammonium salts, ammonium hydroxide, various stable amines, guanidine, guanidine carbonate, biguanide, guanylurea sulfate, melamine, dicyaniamide, calcium cyanamide, biuret, 1,1'-azobisformamide, methylol urea, methylol urea-urea. dimethyl urea, hexamethylene tetramine (HMTA), and mixtures of these. Among the enhancers are the above materials, oxygenated hydrocarbons, and mixtures of these. Thus, unless otherwise specified, reference in this disclosure to urea should not be taken as limiting to urea itself but should extend to urea and all of its equivalents. It is pointed out that the term equivalent is not limited to exact equivalents, and various materials within the listing of equivalents will be optimally operable at some conditions which are different than those for others of the listed materials. Moreover, some of the materials may be more effective than others.

Exemplary of the oxygenated hydrocarbons are ketones, aldehydes, alcohols including polyols, carboxylic acids, sugars, starch hydrolysates, hydrogenated starch hydrolysates, sugar-containing residues such as molasses, and mixtures of any of these. The entire disclosures of U.S. Pat. Nos. 4,719,092, 4,844,878 and 4,877,591 are incorporated by reference herein. The disclosures of these patents set forth in detail not only specific $NO_x$ reducing agents and enhancers, but operating conditions including effective temperatures, concentrations and injection staging In this latter regard, the disclosure of U.S. Pat. No. 4,777,024 is incorporated by reference in its entirety.

The concentration of the reducing agent injected into the effluent should be sufficient obtain a reduction, and preferably ensure a minimization, of the nitrogen oxide concentration. In particular, the reducing agents are employed in total amounts sufficient to provide a molar ratios of reducing agent to baseline nitrogen oxide content (i.e., prior to treatment an that stage) of about 1:4 to about 5:1. The ratio is preferably within the range from 1:2 to 2:1, even more narrowly 2:3 to 6:5. In most situations this amount will be distributed jointly by a number of nozzles from a number of points.

Aqueous solutions are typically employed due to their economy and provide suitable effectiveness in many situations. The effective solutions will vary from saturated to dilute, e.g., from 2 to 80% by weight of the agent in the solvent. More typical concentrations of additive will be in the range of from 5 to 50%, and more narrowly from 10 to 25%, but will vary with operating conditions. While water will be an effective solvent for most applications, there are instances where other solvents, such as alcohols, may be advantageous in combination with water, and others such as hydrocarbons may be suitable for some additives in place of water.

FIG. 1 illustrates in schematic form an apparatus for carrying out a process for minimizing nitrogen oxides in the effluent gases from a combustor, shown as an incineration plant 50.

In the effluent passage 52 above the combustion area 54, three injection zones are installed. Several different reducing agents are prepared as concentrates and stored in tanks 20, 30 and 40, for dilution as required with a suitable diluent such as water and feeding to individual nozzles at a multiplicity of levels in the conbustor 50. As shown in FIG. 1, these zones of injection are provided at progressive spacing distances above the combustion flame. The temperature decreases with successive levels, as illustrated in FIG. 2.

As the combustion proceeds, effluent rises upwardly in this drawing through the passage 52 defined by the combustor walls. There may also be other obstructions, such as banks of cooling tubes and the like, within the combustor and thus defining the area within the passage where chemical introduction must take place. Also, in some cases, the exact location of injection points cannot be chosen due to the need to cut through water-lined walls or tubes and other economic and operational factors. Accordingly, it is often necessary to penetrate large distances across the cross section of the combustor but yet have little spacing from obstructions in the direction of flow.

It is an advantage of the present invention that liquid droplets comprising $NO_x$ reducing agents can be injected at well-controlled particle size distributions and velocities to make the active agents available near the point of injection as well as at the far side of an effluent passage without large numbers of droplets impinging obstructions or surviving beyond the temperature window for $NO_x$ reduction and causing ammonia generation. It is a more specific advantage that this can be done in most situations by injecting from locations at or near the wall of the combustor or other passage. It is a further advantage of the invention that, for reasons which may relate to the ability to efficiently utilize smaller droplets injected from a combustor wall than permitted by prior art methods, the effective temperature window for aqueous solutions of $NO_x$ reducing agents can be widened to include lower temperatures by the invention.

Figure 2:
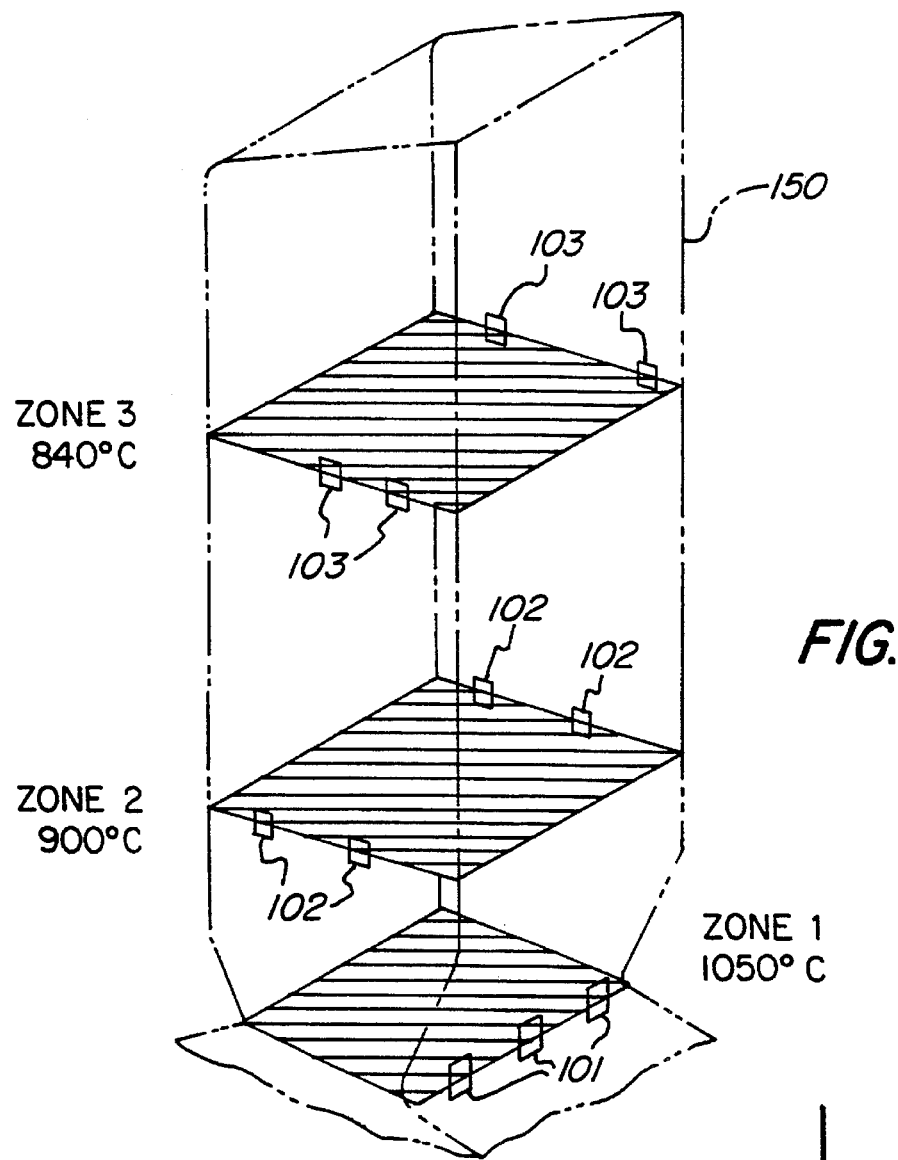
FIG. 2 shows the arrangement of the nozzles in the firing chamber of the apparatus of FIG. 1.

FIG. 2 shows a representation in further detail of an exemplary scheme for injecting a $NO_x$ reducing agent into the upper effluent passage of a combustor 150. In FIG. 2, the injection is designed to take place from nozzles (not shown) positioned in preexisting ports 101, 102 and 103 to achieve uniform distribution of the agent in the cross-sectional planes shown in shading at the various levels. While specific temperatures and locations are illustrated, the exact temperatures an these zones, the chemicals employed and the location of the nozzles will vary with the design and operation of individual units.

Figure 3:
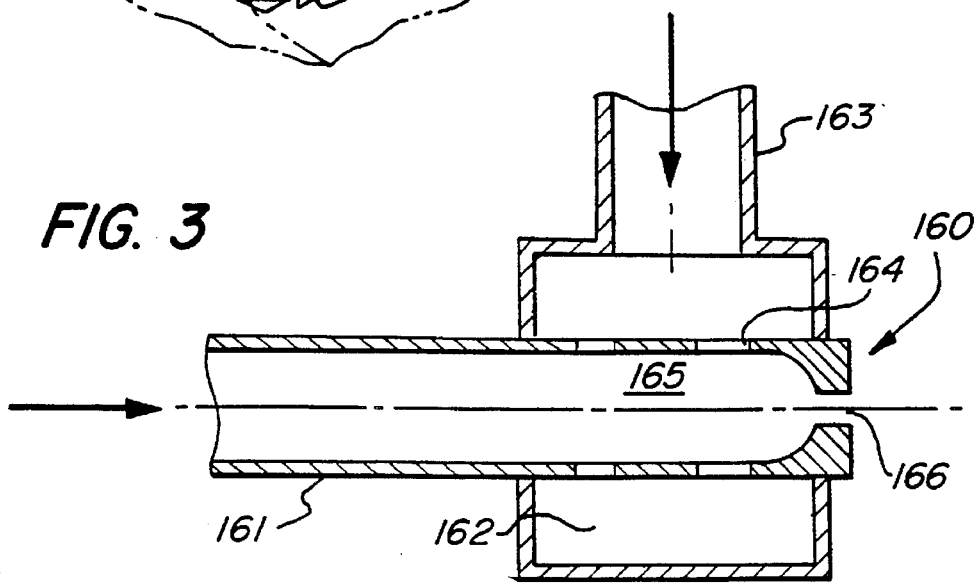
FIG. 3 is a cross sectional view of the detail of a nozzle for use in the invention.

FIG. 3 is the detail in cross-section of an individual nozzle 160. Nozzles of this kind are shown in West German Patent DE-26 27 880 C2, published 11 Nov. 1982, the disclosure of which is incorporated herein by reference.

Nozzles of the type suitable for use in this invention, discharge a two-phase mixture of gas and liquid at the characteristic sonic velocity of the mixture. This is possible because the speed of sound in a two-phase mixture is only a fraction of the speed of sound in the two pure phases. Whereas, for example, the speed of sound under normal conditions in pure water is approximately 1500 meters per second and that in pure air is approximately 330 meters per second, the speed of sound of a mixture of the two components is approximately 20 to 30 meters per second, based on a volumetric proportion of gas of between 30 and 80 percent. Since the outflow velocity of the mixture is equal to its speed of sound, i.e., sonic velocity, the abrupt pressure drop from the mixing cheer produces an intensive division of the liquid phase into small droplets. The droplet diameter is effected essentially by this pressure drop and, as a result, is adjustable. It is an advantage of this invention than due to the sonic velocity of the mixture, excellent entrainment of the surrounding effluent is achieved. This further enhances chemical distribution.

As shown in FIG. 3, the nozzle comprises a liquid conduit 161 surrounded at its end by an annular chamber 162, into which there opens a line 163 for the gas. The annular chamber 162 is connected to the interior of the conduit 161 by means of several transfer holes 164, so that the end region of the conduit 161 functions as a mixing chamber 165.

The ratio of gas flow to liquid flow should be adjusted such that, shortly before exit from the mixing chamber 165 through outlet 166, the ratio is appropriate for the chosen pressure drop to enable injection of the mixture at its sonic velocity. Typically, a volumetric proportion of gas of between 30 and 80% is employed, i.e., in this case, the flow cross-section occupied by the gas amounts to from 30 to 80% of the total flow cross-section.

The pressure ahead of the mixing chamber will typically be in the range of between approximately 1.6 and 40 bar, depending on the desired droplet size and the phase exchange area dependent on this. Pressures on the order of magnitude of from about 3 to about 15, e.g., from about 2 to about 5, bar will be customary.

At the outlet 166, the mixture expands into the effluent passage 52 in FIG. 1, in which a lower pressure prevails. The pressure drop produces a fine atomization when the mixture is expanded. Droplet sizes will be determined based on the requirements of temperature, effluent flow rate, spacing of downstream obstructions, $NO_x$ reducing agent concentration, and desired effect. Typically, droplets will be formed with median diameters of from about 5 to about 1000 μm. For many applications median diameters within the range of from 10 to 125, e.g., less than about 50, μm are effective. The injection at sonic velocity enables effective limitation of oversized droplets, the number having diameters more than twice the median being less than 10%, and the droplets having diameters more than four times the median providing less than 1% of the total flow. The "effective maximum droplet diameter" is the size above which all larger droplets account for less than 1% of the weight of reducing agent.

The atomizing device shown in FIG. 3 serves only to illustrate one suitable form of nozzle. Depending on design and process requirements, the atomizing jet can also be designed and constructed differently. In particular, it is possible to incorporate either convergent or divergent sections of pipe at the end of the mixing chamber 165.

Figure 4:
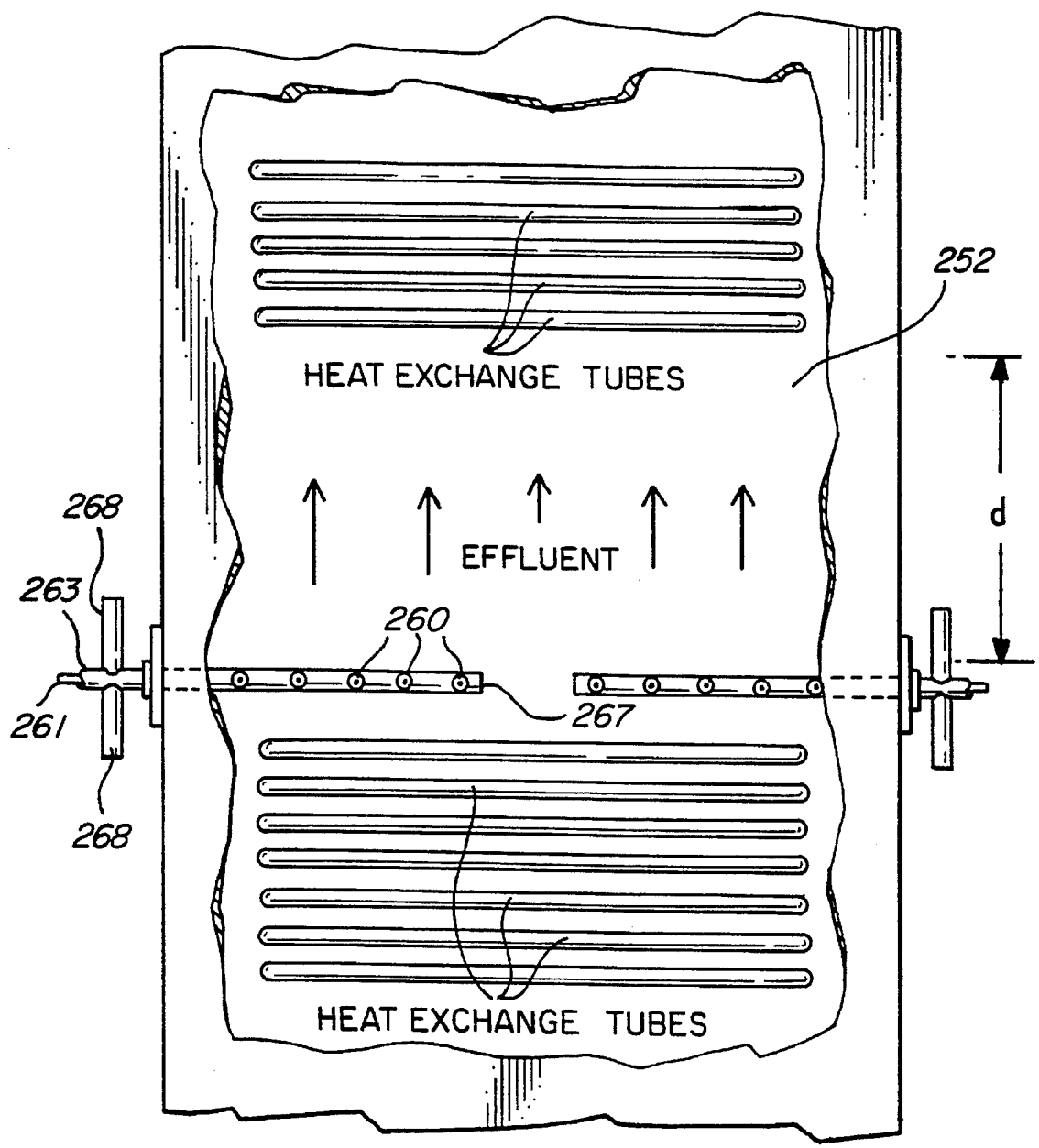
FIG. 4 shows the use of an in-furnace lance employing a plurality of nozzles due to limited spacing in an effluent passage.

FIG. 4 illustrates a solution by the invention of a frequent problem presented where $NO_x$ control is attempted in existing equipment. In this figure, the temperature window for effective $NO_x$ treatment happens to fall between banks of heat exchange tubes in effluent passage 252. The limited space between these banks of tubes makes injection from or near the passage wall inefficient and permits locating an injection lance 267 no further than distance d from the nearest downstream bank. This distance is often as short as 1 to 3 meters. All fluid introduced by lance 267 must be fully vaporized by the time the effluent, often moving at 10 to 25 meters per second, travels the distance d. Thus, in the case where the effluent is moving at about 20 meters per second and the distance d is 2 meters, the liquid must evaporate in 100 milliseconds or less. In fact, all droplets must have been fully evaporated and their gaseous form fully mixed before the effluent is cooled below the effective temperature window in the area of the heat exchange tubes. Thus, there are many instances where complete evaporation of all droplets must take place in under 1 second and frequently less than 500 milliseconds, e.g., on the order of 50 to 250 milliseconds. This is enabled by the present invention which disperses the liquid as fine droplets of uniform size.

Referring again to FIG. 4, lance 267 carries a plurality of spaced nozzles 260, at least some of which are capable of injecting a two-phase pollutant reducing mixture, comprising liquid and gaseous components, into the effluent at sonic velocity. A plurality of lances 267 will typically be employed. The lances are preferably spaced one from the other in a plane spaced a distance d from the next bank of heat exchange tubes (or other obstruction) downstream of the lances. The spacing between the nozzles 260 on an individual lance 267 as well as between lances is desirably kept as uniform as is consistent with effectiveness which will vary with velocity and temperature profiles within the effluent passage. Typically, the inter-as well as intra-lance nozzles will be spaced from about 0.1 to about 2 meters apart, more narrowly from about 0.3 to about 1.5 meters, and in an exemplary design at from 0.4 to 0.6 meters.

The individual lances 267 are fed with a liquid component through conduit 261 and a gaseous component via concentric outer conduit 263. In many circumstances, cooling fluid is fed and returned via lines 268 through a cooling jacket (not shown) which surrounds conduit 263.

The following examples are provided to further explain and illustrate the invention and some of its advantages, but are not to be taken as limiting in any regard. Unless otherwise indicated, all percentages are by weight.

Example 1

An apparatus as generally illustrated in FIGS. 1–3 is installed in an existing incinerator, mounting the nozzles an three levels through existing openings. While FIG. 1 shows all nozzles injecting from a single side for ease of illustration, FIG. 2 depicts the orientation as the nozzles are employed.

The reaction temperature above injection zone is approximately 1050° C., above injection zone 2 about 900° C., and above injection zone 3 about 840° C. Different $NO_x$ reducing agents are metered as aqueous solutions to the nozzles at each of three levels. At zone 1 the agent comprises urea (7 to 10%), at zone 2 the agent comprises urea (7 to 10%) and a sugar solution (1 to 3%), and at zone 3, ammonium formate (7 to 10%). The aqueous solutions of reducing agents are fed at rates between 700 and 1,200 liters per hour with pressurized air at an air-to-liquid ratio in the range of 1:6 to 1:4 and a pressure of 4 to 5 bar, to form a two-phase mixture. The nozzles mix the two phases and inject the mixture at sonic velocity. The droplet size of the injected liquid is smaller than 50 μm. The nozzles are arranged and flows established to obtain uniform distribution of the reducing agent.

The incinerator is operated under conditions giving a baseline $NO_x$ of from 370 to 420 mg/m³ in a combustion effluent which is discharged an 97,000 standard cubic meters per hour, calculated on a dry basis with 11 volume % $O_2$.

The nitrogen oxide and ammonia contents of the flue gas are determined on leaving the vessel. FIG. 5 shows the $NH_3$ concentration in dependency on the content of residual $NO_x$. The CO concentration in the flue gas is not significantly increased by the injection of the reducing agent.

FIG. 6 shows the total consumption of reducing agent, namely the sum of (A), (B), and (C) depending on the $NO_x$ content in the purified gas and the distribution of the reducing agents to the individual injection zones. From data of this type, reducing agent costs can be calculated for a desired degree of nitrogen removal.

Because the injection nozzle zones in the firing chamber are installed using existing openings, an optimized arrangement of the injection openings in the vessel with yet further improved distribution of the chemicals in the flue gas resulting therefrom can be expected.

Example 2

According to this example, a reducing agent is atomized and completely evaporated within a firing vessel with the result than the reducing agent is evenly distributed over the cross-section of the vessel. The reducing agent is injected into the vessel together with pressurized air as a carrier gas via nozzles arranged at the circumference of the vessel.

The nozzle planes are positioned in the direction of flow of the effluent, that is to say they are spaced about 1 meter apart from each other in the vertical direction. The gas temperature at the site, an which the reducing agent is injected, is about 800° to 1000° C. The vessel geometry is such that the penetration of the droplets, than is to say the depth of their horizontal penetration into the vessel, should be about 2 meters to achieve a uniform distribution of the reducing agent over the cross-sectional surface of the vessel. As the nozzle planes are spaced about meter apart from each other, the droplets should evaporate completely after injection before covering a distance of 1 meter in the direction of flow of the effluent so as to be prevented from hitting the nozzles of the next higher plane; therefore, the maximum droplet diameter should not exceed 120 μm an effluent temperature of 800° C.

With the apparatus of the invention it is possible to satisfy all of the aforementioned conditions. Employing a nozzle opening having a diameter of 2 mm, 151.5 liters per hour of reducing agent are atomized by means of 4 kg/h of pressurized air as a carrier gas, whereby an effective maximum droplet diameter of 120 μm at an initial pressure of 4.2 bar absolute is produced. As the droplets of the reducing agent are entrained with the air volume, the penetration meets the requisite 2 meters. The invention thus makes it possible to evenly distribute the reducing agent over the cross-sectional surface of the vessel without forming a large number of droplets which survive evaporation beyond the desired temperature window or impinge surfaces within the vessel.

As a comparison, under similar conditions and with nozzles injecting droplet diameters of similar median size, using subsonic velocities in accordance with the prior art the above results are not possible. The penetration of 120 μm diameter droplets in this case would only be a fraction of the requisite 2 meter penetration, and there would be an undesirably large number of droplets with diameters in excess of 120 μm which would neither penetrate to the desired degree nor fully evaporate at the intended temperature.

Example 3

In this embodiment, the vessel geometry is such that the requisite penetration is about 4 meters. Consequently, the requisite amount of reducing agent per nozzle is correspondingly greater than in Example 1. The nozzles used have an opening diameter of 4 mm and their initial pressure is set at 5 bar absolute. Under these conditions 160 kg/h of reducing agent per nozzle are atomized. The droplets penetrate 4 meters into the effluent as described in Example 2. In this example also, unevaporated droplets are prevented from hitting the nozzles at the next higher nozzle plane or the opposite wall of the vessel.

The above description is for the purpose of teaching the person of ordinary skill in the art how to practice the invention, and it is not intended to detail all of those obvious modifications and variations of the invention which will become apparent to the skilled worker upon reading the description. It is intended, however, that all such modifications and variations be included within the scope of the present invention which is defined by the following claims.

We claim:

1. A process for reducing the concentration of $NO_x$ in a combustion effluent, the process comprising:

preparing a two-phase $NO_x$-reducing mixture containing liquid and gaseous components, said liquid component comprising a solution of urea; and injecting the $NO_x$-reducing mixture at its characteristic sonic velocity into a passage containing a combustion effluent at a temperature effective for reduction of the $NO_x$ by selective gas-phase reaction, wherein the mixture is injected at liquid droplet sizes effective to enable evaporation prior to impingement on a surface within or defining said passage.

2. A process according to claim 1 wherein the $NO_x$-reducing mixture is injected at a pressure of between 1.6 and 50 bar.

3. A process according to claim 1 wherein the gaseous and liquid components are mixed in amounts effective to provide from 30 to 80 volume percent of the gaseous component.

4. A process according to claim 1 wherein the median size of the liquid droplet is within the range of from 5 to 1000 μm.

5. A process according to claim 1 wherein the effective maximum droplet size is no greater than four times the median droplet size.

6. A process according to claim 1 wherein the liquid component is an aqueous solution containing from 10 to 80% by weight of a $NO_x$ reducing agent and the mixture is injected at a temperature effective for the selective non-catalytic reduction of $NO_x$ by the $NO_x$ reducing agent.

7. A process for reducing the concentration of $NO_x$ in a combustion effluent, the process comprising:

preparing a two-phase $NO_x$-reducing mixture containing liquid and gaseous components, said liquid component comprising a solution of one or more materials selected from the group consisting of ammonia, urea, ammonium citrate, ammonium formate, ammonium carbonate, ammonium hydroxide, and ammonium acetate, and said gaseous component comprises air, steam or a mixture of these; and injecting the $NO_x$-reducing mixture at its characteristic sonic velocity into a passage containing a combustion effluent at a temperature effective for reduction of the $NO_x$ by selective gas-phase reaction, wherein the mixture is injected at liquid droplet sizes effective to enable evaporation prior to impingement on a surface within or defining said passage.

8. A process according to claim 7 where different mixtures of chemicals are injected at each of a plurality of temperature zones, with an enhancer comprising an oxygenated hydrocarbon being injected into at least one zone.

9. A process according to claim 8 wherein the oxygenated hydrocarbon is selected from the group consisting of alcohols, ketones, sugars, and mixtures of these.

* * * * *